United States Patent [19]

Neuwirth et al.

[11] Patent Number: 4,910,489

[45] Date of Patent: Mar. 20, 1990

[54] GAS TUBE FAIL-SAFE DEVICE FOR TELEPHONE PROTECTOR MODULES

[75] Inventors: Helmuth Neuwirth, Garden City; Carl Meyerhoefer, Dix Hills, both of N.Y.

[73] Assignee: Porta Systems Corp., Syosset, N.Y.

[21] Appl. No.: 345,446

[22] Filed: May 1, 1989

[51] Int. Cl.$^4$ .................... H01H 39/00; H02H 7/24

[52] U.S. Cl. .................................... 337/32; 361/124

[58] Field of Search .................... 337/32, 15, 28, 24, 337/403, 404, 407; 361/124

[56] References Cited

U.S. PATENT DOCUMENTS

| | | | |
|---|---|---|---|
| 2,413,887 | 1/1947 | Pittman . | |
| 3,023,289 | 2/1962 | McAlister . | |
| 3,123,696 | 3/1964 | McAlister . | |
| 3,254,189 | 5/1966 | Sprow . | |
| 3,710,297 | 1/1973 | Kawazoe | 337/290 |
| 4,047,143 | 9/1977 | Burden et al. | 337/239 |
| 4,223,641 | 11/1980 | Baumbach | 361/124 |
| 4,502,689 | 10/1987 | Smith, Sr. | 337/215 |
| 4,717,902 | 1/1988 | James | 337/32 |

*Primary Examiner*—H. Broome

*Attorney, Agent, or Firm*—Charles E. Temko

[57] ABSTRACT

A fail-safe secondary fuse device for assuring the grounding of a conductive gas tube used in modular protection devices for individual subscriber circuit pairs. The device resiliently engages each of the three end and center electrodes normally provided on the tube. In the case of the end electrodes, the device is insulated from direct electrical communication by a fusible sleeve of insulative material which fuses under heat emanating from the gas tube with the occurrence of continued current overload.

1 Claim, 1 Drawing Sheet

GAS TUBE FAIL-SAFE DEVICE FOR TELEPHONE PROTECTOR MODULES

BACKGROUND OF THE INVENTION

This invention relates generally to the field of telephony, and more particularly to an improved form of secondary or back-up protection for individual subscriber pair protector modules normally installed upon a main frame in a telephone office.

Such protector modules traditionally employ a pair of carbon electrodes which arc upon the occurrence of momentary current overload to ground the individual circuit. Later developments included heat-sensitive devices employing a fusible solder member which upon fusing, allows a resilient member to permanently short the module to ground.

A still later development, now in widespread use is the so-called three element gas tube in which momentary overloads cause the tubes to become conductive to short the overload to ground and in which, upon the occurrence of a sustained overload, the tube develops sufficient heat to activate a separate heat-sensitive device to cause permanent shorting to ground.

With the development of requirements for protective modules of ever smaller dimensions consistent with connector blocks having ever higher circuit densities, the use of conventional heat sensitive devices including heat coils becomes more difficult because of space limitations, and it has become necessary to provide a heat-sensitive element of sufficiently simple construction to supplement the action of the three-element gas tube without requiring significant additional volume within the protector module housing.

SUMMARY OF THE INVENTION

Briefly stated, the invention contemplates the provision of an improved fail-safe heat-sensitive device of the class described in which the usual heat coil and solder pellet has been replaced by a resilient member having fusible components adapted to engage the laterally extending contacts on the three electrodes of a conventional gas tube in such manner that contact with the end electrode is through a length of fusible synthetic resinous material. Upon the occurrence of a sustained overload, the fusible material is destroyed by heat emanating from the gas tube, allowing the end electrodes to be shorted to the center electrode which is normally grounded. In one embodiment the device comprises a length of metallic wire having a medially disposed portion looped about the contact of the center electrode. In a second embodiment, the device comprises a metallic stamping and is shaped so as to be resiliently maintained in position once installed.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figures 1, 2, 3, 4, 5, 6:
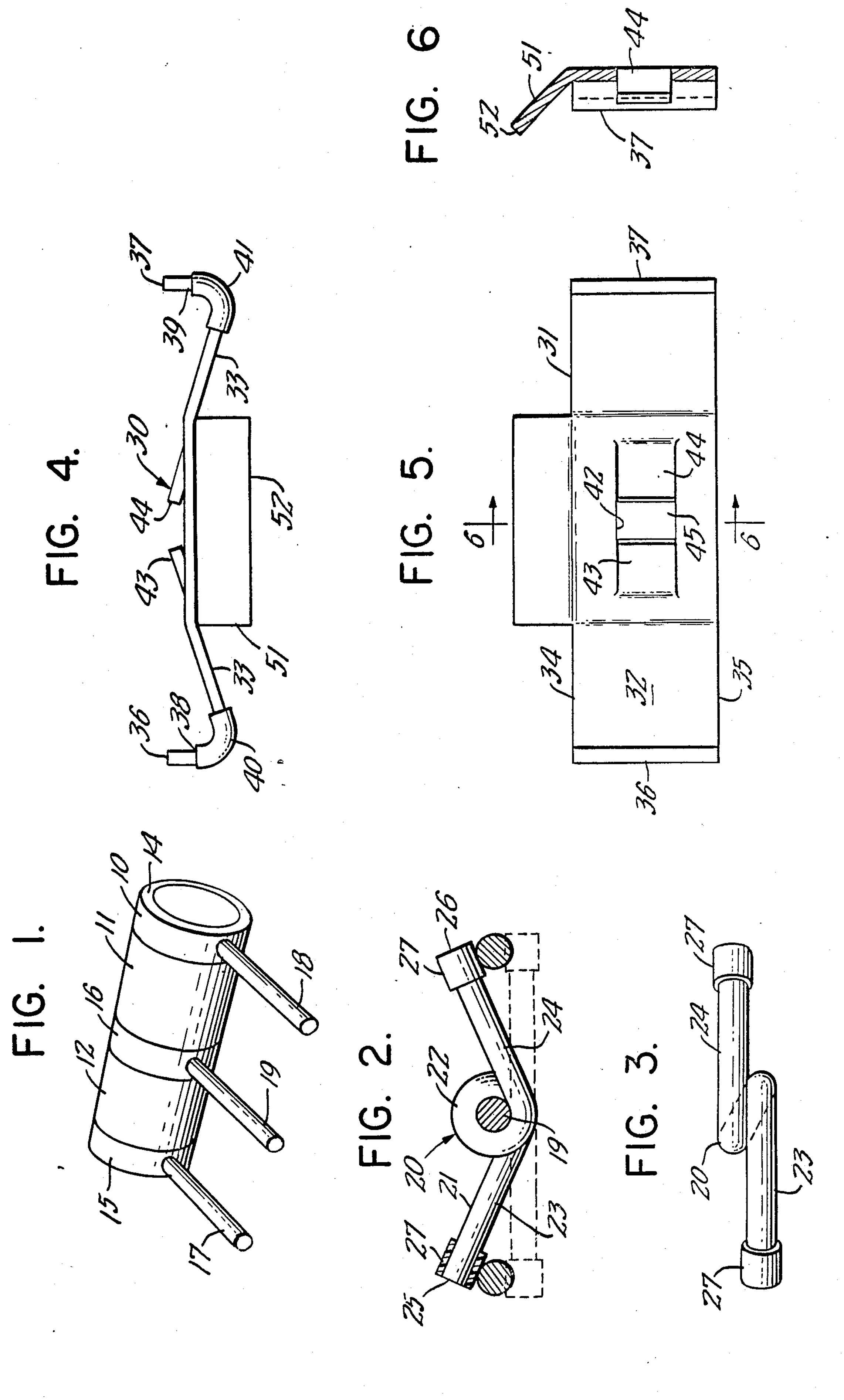
FIG. 1 is a view in perspective of a conventional cylindrical three-element gas tube forming a part of the disclosed embodiment.
FIG. 2 is a side elevational view, partly in view of a wire spring element forming another part of the disclosed embodiment.
FIG. 3 is a top plan view as seen from the upper portion of FIG. 2.
FIG. 4 is a side elevational view showing a second embodiment of the invention.
FIG. 5 is a top plan view as seen from the upper portion of FIG. 4.
FIG. 6 is a sectional view as seen from the plane 6—6 in FIG. 5.

In accordance with the invention, reference character 10 designates a known three-element gas tube of a type commonly used as the principal protection means in individual subscriber circuit protector modules (not shown). The gas tube normally includes a ceramic main body 11 forming first and second sections 11 and 12 each of which is filled with a gas, such as neon gas, which becomes electrically conductive above a predetermined potential. Communicating with the sections 11 and 12 are end electrodes 14 and 15 and a central electrode 16 which, in installed condition within the module, communicates with a ground pin or socket which, in turn, communicates with a source of ground potential on the protector block upon which the module is mounted. Each of the electrodes 14–16 includes a laterally extending contact 17, 18, and 19.

The first embodiment of the invention is generally indicated by reference character 20, and comprises a length of spring music wire 21 of diameter approximating 0.020 inches. The wire is initially deformed to include a central loop 20 adapted to surround the contact 19, as well as first and second rectilinear legs 23 and 24 terminating in ends 25 and 26, respectively. Surrounding the ends 24 and 25 are insulative sleeves 27 which are most conveniently formed by dipping the ends into a uncured synthetic resinous composition such as polyvinylchloride to obtain a thickness ranging from 0.003 to 0.005 inches, and curing the composition in situ.

As seen in FIG. 2, the embodiment 20 is installed on a gas tube 10 by lightly stressing the same and engaging the loop 22 upon the contact 18, and permitting the ends 25 and 26 to rest upon the contacts 17 and 18 in spaced insulated relation. In operation, the gas tube will become momentarily conductive upon the occurrence of momentary excess voltages surges. Should a sustained current overload be developed, the tube 10 may not be grounded due to lack of sufficient voltage, but will develop heat in accordance with the amount of current imposed upon the tube. This heat will serve to fuse the sleeves 27, permitting the ends 25 and 26 to contact the contacts 17 and 18, and thus, effectively short the end electrodes 14 and 15 to the central grounded electrode 16.

In the case of the second embodiment, generally indicated by reference character 30, this embodiment differs from the first embodiment in the substitution of a planar body 31 for the wire 21, the body being formed of spring steel or similar material as a stamping. The body 31 is bounded by an upper surface 32, a lower surface 33, side edges 34 and 35, and end edges 36 and 37. To assist in maintaining the second embodiment in position upon the gas tube, the edges 36 and 37 are bent upwardly to form generally arcuately shaped terminals 38 and 39 which partially wrap around the contacts 17 and 18. As is the case in the first embodiment, insulative sleeves 40 and 41 are provided.

The body 31 includes a centrally disposed rectangular opening 42 bordered by first and second upwardly bent tabs 43 and 44 which engage the contact 19 which is then positioned within an open planar area 45 disposed therebeneath.

The second embodiment may also include an optionally laterally extending member 51 which may be bent downwardly as seen in FIG. 4 to provide an edge 52 which may engage an inner surface of the protector module housing for purposes of location. In use, the second embodiment functions in the same manner as that of the first embodiment, in which excess sustained current overloads are transformed into heat sufficient to fuse the insulative sleeves 40 and 41 resulting in grounding the end electrodes of the gas tube to the center electrode.

It will be observed that both elements require only limited space within the protector module, and completely eliminate the need for devices having a similar function but requiring much greater volume, such as wire wound heat coils which serve to melt a solder pellet and thus release a separate coil spring which effects a grounding fucntion.

We wish it to be understood that we do not consider the invention to be limited to the precise details of structure shown and set forth in this specification, for obvious modifications will occur to those skilled in the art to which the invention pertains.

We claim:

1. An improved thermally sensitive secondary protection device for use with three-element gas tubes employed for protecting individual telephone subscriber circuits, said gas tube including first and second end electrodes, and a centrally disposed electrode, said centrally disposed electrode having a laterally extending contact thereon; said protective device comprising: a length of resilient conductive material having a principal axis parallel to that of said tube, and having first and second end portions and a medially disposed portion therebetween; said first and second end portions being resiliently engageable with said first and second end electrodes on said gas tube, and having a fusible insulative covering normally preventing electrical current conduction therebetween; said medially disposed portion including means engaging said contact on said center electrode on said gas tube in electrically conductive relation; whereby, the development of a predetermined degree of heat by said gas tube upon the occurrence of a sustained current overload, will cause fusing of said insulative covering on said first and second end portions, causing shorting of said end electrodes to said center electrode; said length of resilient conductive material being in the form of a stamping of planar resilient material, the end portions of which form arcuately shaped recesses for engaging the first and second end electrodes of a gas tube to fix the relative position therebetween, said medially disposed portion including a centrally disposed opening bordered by first and second laterally bent tabs, said tabs resiliently engaging said laterally extending contact.

* * * * *